E. WELSH.
GARDEN MARKER FOR RAKES.
APPLICATION FILED MAR. 28, 1919. RENEWED JAN. 25, 1922.

1,417,705.

Patented May 30, 1922.

INVENTOR.
Edward Welsh,
BY HIS ATTORNEY:
A. M. Carlsen.

UNITED STATES PATENT OFFICE.

EDWARD WELSH, OF WAUSAU, WISCONSIN.

GARDEN MARKER FOR RAKES.

1,417,705.
Specification of Letters Patent.   Patented May 30, 1922.

Application filed March 28, 1919, Serial No. 285,726. Renewed January 25, 1922. Serial No. 531,824.

*To all whom it may concern:*

Be it known that I, EDWARD WELSH, a citizen of the United States, residing at Wausau, in the county of Marathon and State of Wisconsin, have invented a new and useful Garden Marker for Rakes, of which the following is a specification.

My invention relates to lawn and garden implements, and the main object is to provide a rake with means for marking parallel lines at different distances apart upon the soil of a garden for the guidance of the planting of seeds in spaced rows therein.

Figure 1:
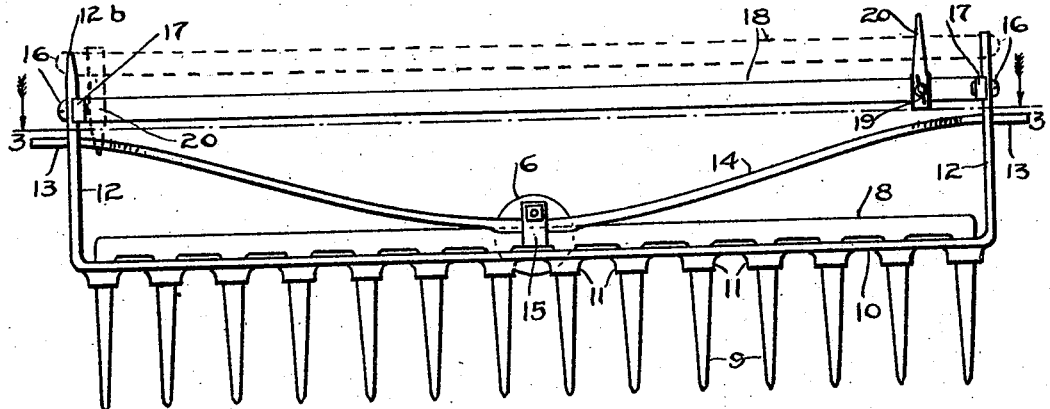
Figure 2:
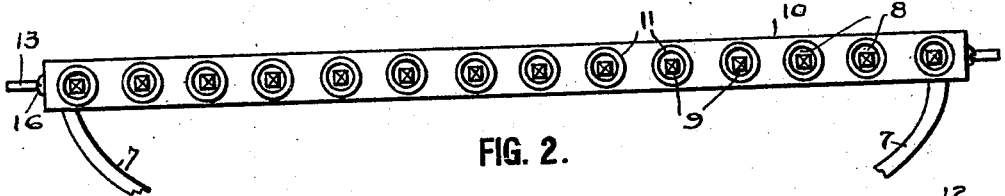

In the accompanying drawing Fig. 1 is a front end elevation of my improved rake. Fig. 2 is an underside view of the front portion of the rake.

Figure 3:
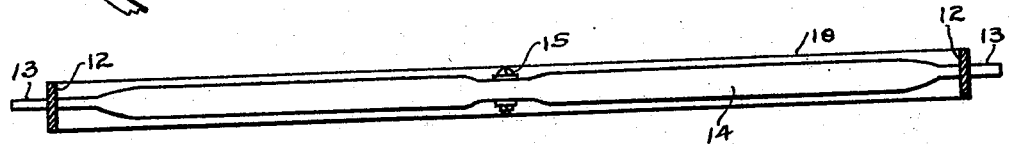
Figure 4:
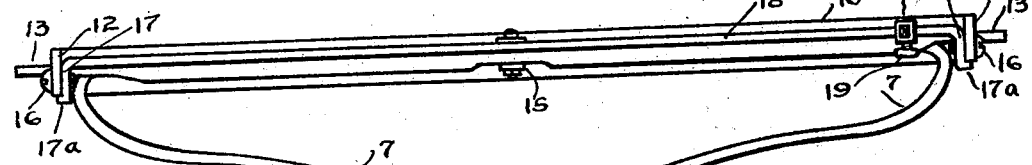
Figure 5:
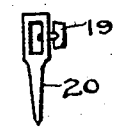
Figure 6:
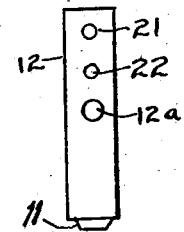

Fig. 3 is a section on the line 3—3 in Fig. 1. Fig. 4 is a top view of the front portion of the rake. Fig. 5 is a detail view of the movable marking member of the tool. Fig. 6 is an end view of the stripper bar.

Referring to the drawing by reference numerals, 6 designates the handle of the combination tool under consideration, it may be the length of an ordinary rake handle. Secured in said handle is a metallic yoke 7, integral with which is formed the cross bar or head 8 and the teeth 9 of the rake. Upon said teeth is placed a flat perforated stripper bar 10, the perforations of which are surrounded by collars 11 formed integral with the stripper bar; said collars afford extended guidance to the teeth so they can never escape entirely out of the stripper, although the latter is thin.

The end portions of the stripper bar are bent upwardly at right angles to the bar to form two short arms 12, each of which has a perforation 12ª for the reduced ends 13 of a bow-shaped spring 14, which has its middle portion secured to the rake head by a clip 15.

Secured to the arms 12 by screws 16 are the angular end portions 17 of a bar 18; and upon the latter bar is slidably secured by a set screw 19 a marker finger 20. Each arm 12 is provided with two holes 21, 22 (shown in Fig. 6) for the screws 16.

In the operation or use of the tool, if the same is to be used for a long time as a rake only, the screws 16 are placed in the holes 21 and will hold the bar 18 as in dotted lines in Fig. 1, about even with the ends of the arms 12, and with the marker 20 pointing toward the rake head; but when the device is to be used as a marking tool and a rake alternately as in preparing a garden for seeding, the screws 16 are moved to the holes 22 and the marker 20 turned as shown in full lines in Fig. 1, and moved to the desired distance away from the end 12ᵇ of one of the arms 12. The other arm 12 being shorter beyond the bar 18 than the finger 20, it follows that by dragging the tool along the raked surface of the garden the markers 20 and 12ᵇ will mark two parallel lines, one of which may be used as guiding line for one of the markers while the other marker makes a third line, and so on the garden may be laid out into beds and into rows of plants in each bed, and by drawing cross lines over a lot of said parallel lines even the distances between the hills or plants in each row may be laid out.

To prevent rotation of the bar 18 on its screws 16, the angular parts 17 of the bar are formed with short hooks 17ª (see Fig. 4) engaging the edges of the arms 12.

What I claim is:—

1. The combination with a rake handle and its head of an attachment for marking ground to be seeded, said attachment comprising two arms extending upwardly beyond the rake head, a straight bar connecting said arms and secured slightly away from their ends, and a marking finger slidably secured upon said bar.

2. The structure specified in claim 1, said finger being reversible so as to point toward the head of the rake when so desired.

In testimony whereof I affix my signature.

EDWARD WELSH.